Figure 1:
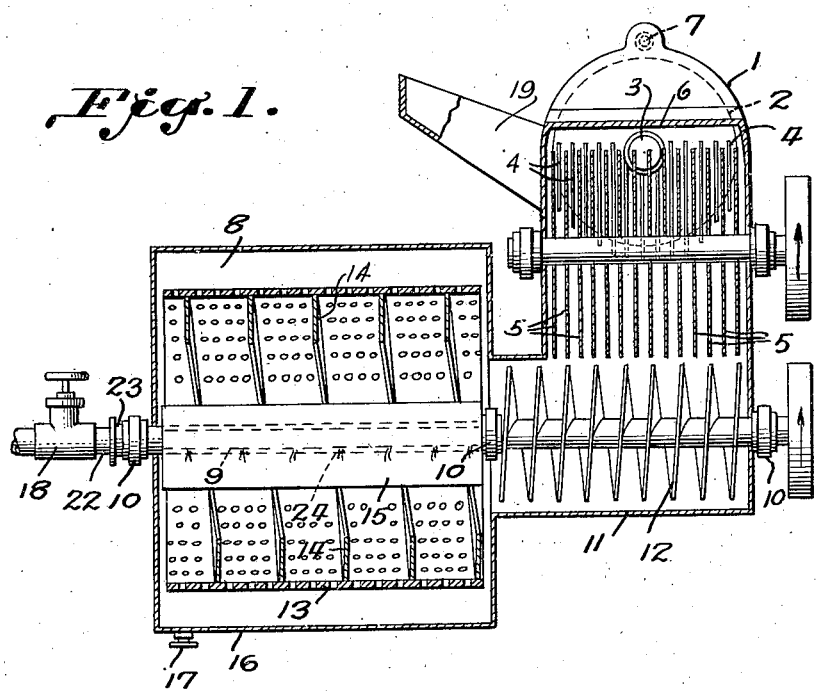
Figure 1:
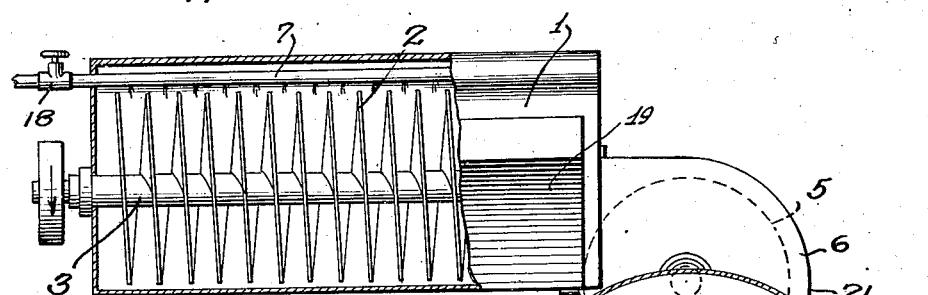
Figure 2:
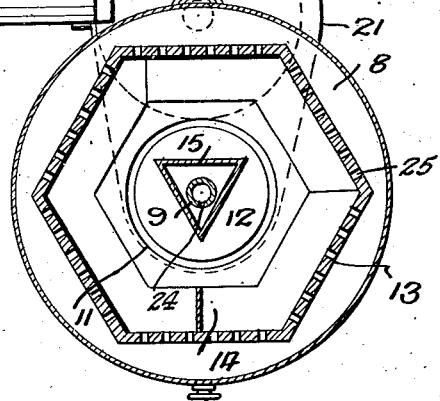
Figure 3:
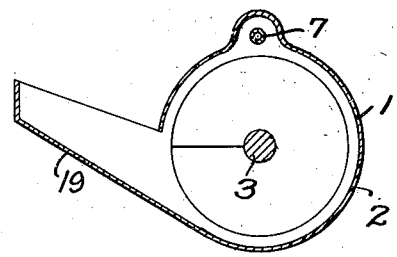
Figure 4:
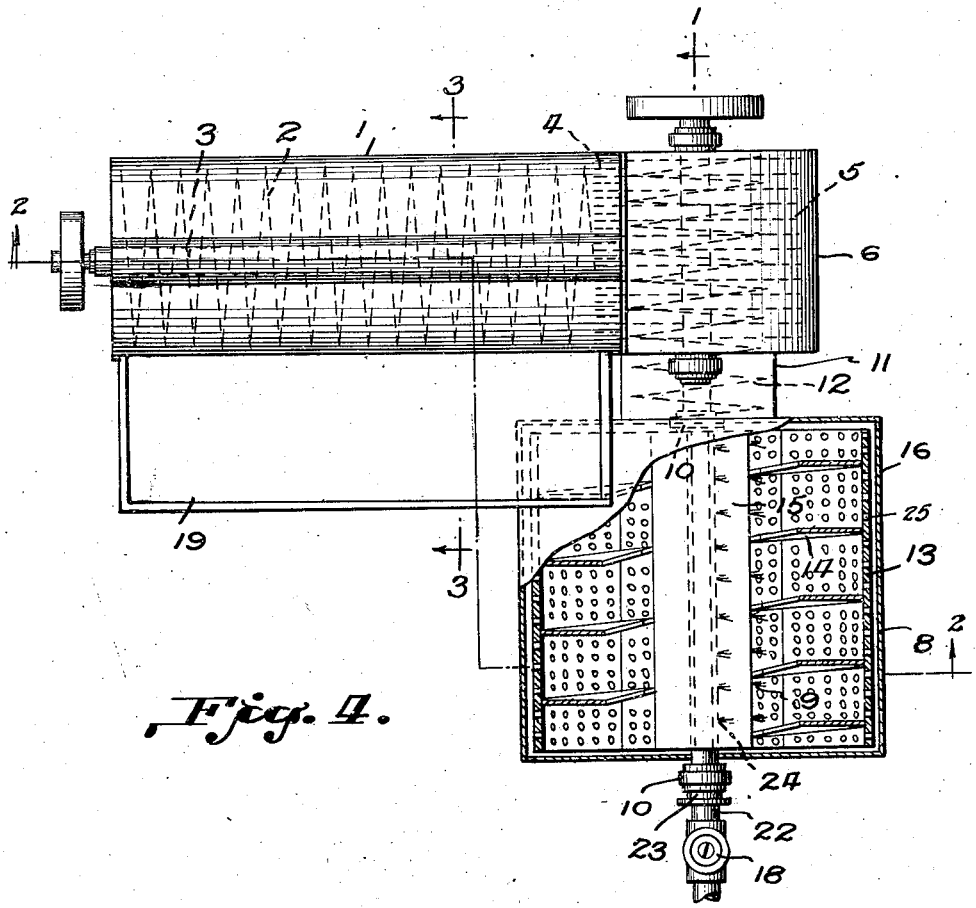

April 30, 1940.  P. L. FAUTH  2,199,088

PROCESS AND APPARATUS FOR COMMINUTING AND WASHING WHALE MEAT

Filed March 19, 1936   2 Sheets-Sheet 1

INVENTOR
PHILIPP LORENZ FAUTH

Richards & Geier
ATTORNEYS

April 30, 1940. P. L. FAUTH 2,199,088
PROCESS AND APPARATUS FOR COMMINUTING AND WASHING WHALE MEAT
Filed March 19, 1936 2 Sheets-Sheet 2

INVENTOR
PHILIPP LORENZ FAUTH

Richards & Geier
ATTORNEYS

Patented Apr. 30, 1940

2,199,088

UNITED STATES PATENT OFFICE 2,199,088

PROCESS AND APPARATUS FOR COMMINUTING AND WASHING WHALE MEAT

Philipp Lorenz Fauth, Wiesbaden-Dotzheim, Germany

Application March 19, 1936, Serial No. 69,653
In Germany March 20, 1935

5 Claims. (Cl. 17—2)

The present invention relates to a machine for cutting up whale meat and to a method of cutting and washing blood-containing meat.

An object of the present invention is to provide a method and means for comminuting whale meat which are inexpensive and efficient in operation.

The processing of the lean whale meat into meat food products, meat extract and the like in floating factories, has only recently been brought into importance.

It is however known that the processing of whale meat in such factories can only be carried out economically in consequence of the high expedition costs, if a large number of whales can be processed in the short working period of about four months.

In order to carry out this process, the meat must be comminuted and it has been shown that this comminution process must yield small, smoothly cut and well washed pieces of flesh since otherwise great difficulties will be encountered in the operation, and interruption will occur. In a modern floating factory about 1200–1500 tons of meat, blubber and bones from which amount about 400–600 tons are of lean meat are processed daily. This meat contains about 70% of water and 2–3% of fat and is strongly soaked with blood and on account of the fast speed of operation arrives at such factories for processing almost at body temperature. In this condition the meat is soft, and with the apparatus heretofore available it cannot be comminuted into uniform easily washable lumps as is required for the present special purpose. In addition the lean whale meat is traversed with sinews which make the comminution of the flesh considerably more difficult.

The conventional comminution machines known as meat choppers are not suitable for the comminution. They are not satisfactory for mass production because the tough but supple sinews wrap themselves around the pressing screws and shafts and thus cause breakage and interruption. Insofar as they do work, however, they do not deliver any lumps of meat but an emulsion-like unwashable meat pulp, for the pressure screw crushes and presses the warm soft meat through the perforated plates and the resulting combination is thereafter emulsified. While comminuted, the meat is washed in order to remove the blood as far as possible. If, however, in consequence of the comminution an emulsion is formed, then the washing process not only washes away the blood but also the fat and small particles of flesh.

Attempts have been made to accomplish the comminution of the poorer quality of meat by means of fast rotating drums provided with knives which work together with stationary counter-knives, but without any satisfactory result because the meat is merely crushed and torn thereby but not cut. The fat is partly squeezed out but the sinews are not cut but torn into long threads to which bits of meat still hang. The resultant lumps of meat, insofar as one can speak of them as such, are very unequal in size and washing of this meat as well as further processing is difficult. The long thread-like sinews present special difficulties for they wind themselves around every rotating machine part.

Experiments carried out with rotating circular knives the side surfaces of which carry oblique knives extending at right angles to these surfaces and somewhat behind the cutting edges of the circular knives have not offered any solution of the problem. Although the rotating circular knives cut the meat in equal long strips, the transverse knives, which should comminute the strips which have been cut by the circular knives into lumps 1 centimetre thick, exert no cutting action but only hack and crush or press the meat. Since the meat has many sinews dispersed therein, and these are not cut by the hacking action of the transverse knives the result is that the meat is torn away from the sinews, while the sinews themselves leave the machine in long threads with meat partly hanging on to them. Owing to the crushing of the meat there is at the same time a powerful entry action effected by the fast rotating transverse knives which according to the condition of the meat produce unequal lumps. Under the meat which becomes partly chopped up into a mash there are found also lumps up to 10 cms. thick.

Attempts have been made to arrange two circular knives one under the other in which one circular knife is intended to carry out the cross-sectional cutting and the other the cutting in the longitudinal direction. It was found impossible however, to introduce the lumps cut in the longitudinal direction to the circular knife rotating in a plane at a right angle with respect to the plane of the upper knife, so that a regular cross cut would be obtained. The meat lumps cut longitudinally will scatter due to the high speed of revolution of the circular knives. At a slower speed of revolution the sinews will not be severed and in addition to a generally bad output a smooth cutting operation can not be achieved.

side of said trough and adjacent said slotted end and projecting through said slots in a direction transverse to said spiral knife, whereby said lumps will be cut into smaller pieces in a successive and continuous operation.

2. A machine for cutting up whale meat comprising a feed hopper, said feed hopper being arranged in a slanting position, means for sprinkling water on the interior bottom surface of said hopper, whereby lumps of meat will slide readily on said surface, a wash trough mounted beneath said hopper, a spiral knife rotatably mounted in said wash trough and substantially parallel with the axis thereof, whereby said lumps of meat are cut into oblique strips, said wash trough being provided with a plurality of slots in one end, a gang of circular cutters rotatably mounted outside of said trough and adjacent said slotted end and projecting through said slots in a direction transverse to said spiral knife, whereby said lumps will be cut into smaller pieces in a successive and continuous operation, a washing device mounted beneath said gang of circular cutters having a wash trough and a drum, and means mounted in said trough for transporting the pieces of meat into said drum wherein the same are further washed and processed.

3. A machine for cutting up whale meat comprising a feed hopper, said feed hopper being arranged in a slanting position, means for sprinkling water on the interior bottom surface of said hopper, whereby lumps of meat will slide readily on said surface, a wash trough mounted beneath said hopper, a spiral knife rotatably mounted on said wash trough and substantially parallel with the axis thereof, whereby said lumps of meat are cut into oblique strips, said wash trough being provided with a plurality of slots in one end, a gang of circular cutters rotatably mounted outside of said trough and adjacent said slotted end and projecting through said slots in a direction transverse to said spiral knife, whereby said lumps will be cut into smaller pieces in a successive and continuous operation, a washing device mounted beneath said circular cutters having a wash trough and a drum, a hollow rotatable shaft extending through said trough and said drum, a polygonal drum mounted on said rotatable shaft within said first mentioned drum and a third drum having a different number of sides than said second mentioned drum mounted on said rotatable shaft within said second mentioned drum, a conveyor screw in said trough for transporting the pieces of meat into said second mentioned drum, and means in said drums for washing the meat, the blood being removed therefrom by the beating effect produced by virtue of the different number of sides in said polygonal drums.

4. The method of cutting and washing blood-containing meat, particularly whale meat and the like, comprising the steps of continually cutting the meat in strips and simultaneously supplying water to the meat, automatically moving said strips one after the other for the purpose of cutting them again, and then cutting the strips transversely to the direction in which they were originally cut while holding them to prevent their receding during this second cutting operation.

5. The method of cutting and washing blood-containing meat, particularly whale meat and the like, comprising the steps of continually cutting the meat in strips and simultaneously supplying water to the meat, automatically moving said strips one after the other for the purpose of cutting them again, then cutting the strips transversely to the direction in which they were originally cut while holding them to prevent their receding during this second cutting operation, washing the cut strips and beating them to remove blood.

PHILIPP LORENZ FAUTH.